United States Patent Office 2,734,916
Patented Feb. 14, 1956

2,734,916

SEBACIC ACID PRODUCTION IN THE PRESENCE OF BARIUM COMPOUNDS

Don S. Bolley, Watchung, and Frank C. Naughton, North Bergen, N. J., assignors to The Baker Castor Oil Company, Jersey City, N. J., a corporation of New Jersey No Drawing. Application March 10, 1954, Serial No. 415,426

19 Claims. (Cl. 260—531)

This invention relates to the conversion of ricinoleic compounds into other organic compounds including sebacic acid and salts thereof by means of an alkaline fusion process. This process is characterized by the presence of barium compounds in the alkaline bath in which the conversion is effected.

It has been known in the past to prepare sebacic acid and related compounds by the alkaline fusion of ricinoleic derivatives. However, serious difficulties have been encountered; namely, violent foaming, incomplete reaction due to the transformation of the reaction mixture into a rigid mass during the heating, and the required neutralization of the alkaline bath in the process of recovering sebacic acid therefrom. Attempts to overcome the prior art difficulties have involved the use of super-atmospheric pressures and a consequent need for cumbersome equipment, slow addition of the ricinoleate to the reaction bath, or the presence of high boiling, inert organic liquids. The need for these unsatisfactory expedients has been overcome in the process described below.

It is an object of this invention to prepare sebacic acid and related compounds by an improved alkaline fusion process. Another object is to provide a process which enables recovery of sebacic acid without neutralization of the alkaline bath. It is a further object to eliminate the foaming and incomplete reaction difficulties encountered in the past. It is also an object of this invention to eliminate the need for conducting the reaction under super-atmospheric pressures, in the presence of inert organic liquids, and the like. A further object is to provide a simple, continuous process for the conversion of ricinoleic compounds by alkaline fusion, involving the recycling of a barium compound to the fusion bath; the barium compound is used in the process substantially without loss. Additional objects will be apparent from the following description of the invention.

It has now been found that the conversion of ricinoleic compounds by means of alkaline fusion proceeds smoothly and rapidly when a barium compound is added to the alkaline bath in which the conversion is effected. In general, the process of this invention involves using a heated bath comprising an alkali metal hydroxide and a barium compound, adding a ricinoleic compound and water thereto, collecting and condensing the crude capryl alcohol vapors, removing the solid barium sebacate from the fusion bath by filtration without neutralization, recovering sebacic acid and a barium compound from the barium sebacate, and recycling the barium compound to the fusion bath.

The fusion bath contains an alkali metal hydroxide, such as sodium hydroxide, potassium hydroxide, or lithium hydroxide. Sodium hydroxide is the preferred alkali metal hydroxide from the solubility standpoint, the maintaining of fluidity in the fusion bath being best achieved with this hydroxide. The barium compound incorporated in the fusion bath may be a water-soluble, ionizable barium compound or a barium compound which is converted into a water-soluble, ionizable compound under the reaction conditions, typical suitable barium compounds being barium hydroxide, barium oxide, barium chloride, barium bromide, barium iodide, barium hypophosphite, barium ricinoleate, barium formate, barium acetate, barium propionate, barium phenolate, and the like. From about 2.0 to about 5.0 moles of the barium compound and from about 10 to about 20 moles of the alkali metal hydroxide should preferably be present in the fusion bath per mole of effective ricinoleic compound charged thereto. Satisfactory results are attained if the fusion bath contains at least about 0.5 mole of the barium compound and at least about 5.0 moles of the alkali metal hydroxide per mole of effective ricinoleic compound. "Effective ricinoleic compound" refers to each available ricinoleic chain; for example, in the case of castor oil, there are three such chains per molecule.

In addition to the alkaline constituents, there should be present in the reaction zone from about 4 to about 5 moles of water per mole of effective ricinoleic compound. This result can be achieved by appropriate additions of water to the reaction zone during the course of the reaction. A satisfactory amount of water in the fusion bath, prior to its being heated, is up to about 20% of water by weight.

Any of the ricinoleic compounds may satisfactorily be used in the process of this invention. Examples of the ricinoleic compounds are alkali metal ricinoleates, such as sodium ricinoleate; barium ricinoleate; monohydric alcohol esters of ricinoleic acid, such as methyl ricinoleate, and butyl ricinoleate; ricinoleyl alcohol; and polyhydric alcohol esters of ricinoleic acid, such as castor oil and ethylene glycol ricinoleate. The ricinoleic compound and water may suitably be charged continuously to the fusion bath.

The process of this invention is conducted at temperatures ranging from about 225° to about 375° C. The preferred temperature conditions involve maintaining the fusion bath at a temperature of from about 225° to about 300° C. The reaction is normally effected under partial reflux conditions. The reaction enclosure may be constructed of any suitable material, nickel and nickel alloys being exemplary thereof.

The use of an alkali metal hydroxide, such as sodium hydroxide, in the fusion bath is desirable from an economic standpoint. However, this hydroxide could not be entirely replaced, in any case, by barium hydroxide, since barium hydroxide loses its water of crystallization at about 110° C., and the resulting anhydrous compound does not melt within the range of reaction temperatures for this reaction. This is unsatisfactory, since fluidity of the fusion bath is an important factor in maintaining a smooth, rapid reaction. In this connection, it should be pointed out that calcium hydroxide is an unsatisfactory constituent of the fusion bath, since baths containing calcium hydroxide, even when an alkali metal hydroxide is present, remain solid within the range of reaction temperatures for the process of this invention.

It has been determined that the reaction is complete as soon as the addition of the ricinoleic compound to the reaction zone has been finished. This is one reason why the reaction can be conducted effectively on a continuous basis. The rate of addition of ricinoleic compound to the reaction zone is not critical. In the examples presented herewith, a convenient rate of addition was from about 0.5 to about 1.0 mole of ricinoleic compound per hour.

As indicated, the fusion bath is maintained in a fluid condition, and this eliminates the difficulty encountered in the prior art with the formation of lumps and consequent incomplete reactions. The other principal prior art difficulty, namely, bad foaming, is noted throughout the entire reaction temperature range if the barium compound is absent from the fusion bath. But, surprisingly, foaming is eliminated by the incorporation of the barium compound in the bath.

The volatile reaction products and water vapor are taken off overhead through a partial reflux system. The principal volatile product, capryl alcohol, is recovered, along with any other condensable products such as methyl hexyl ketone, by passing the volatiles through a condenser system.

The barium sebacate formed in the reaction is insoluble in the fusion bath, and thus is readily separable therefrom. This produces a decided advantage in the recovery of the sebacic acid, since neutralization of the alkaline bath is eliminated. As noted, prior art methods have required such neutralization, and this meant the effective loss of the alkaline bath in the recovery of the sebacic acid therefrom.

In the case of batch reactions, subsequent to the completion of the reaction, the fusion bath can suitably be cooled and diluted with water to a solute content of substantially less than 50%, the barium sebacate being separated therefrom by filtration. The sebacic acid is obtained by acidification of the barium sebacate with a mineral acid, the sebacic acid formed being insoluble and recoverable by filtration. The sebacic acid may be purified thereafter by solution in hot water and subsequent precipitation by cooling of the solution. When the acidification step is effected with hydrochloric acid, the filtrate resulting from the separation of the sebacic acid contains barium chloride. This filtrate can be combined with the filtrate containing barium hydroxide and alkali metal-hydroxide from the barium sebacate filtration, and the resulting solution concentrated to at least a 50% concentration. In this step, alkali metal chloride precipitates, and is separated by filtration. The resulting filtrate contains barium hydroxide and alkali metal hydroxide, and can be returned to the reaction enclosure for reaction with further quantities of the ricinoleic compound.

This procedure enables the re-use of the barium compound or compounds in the fusion bath substantially without loss. This feature represents an important advantage of the process, since it means that the additive which effects the processing improvements of this invention can be used without causing the increased operating cost which would result if the barium compounds were consumed in each run.

If desired, and especially in connection with a continuous reaction process, the fusion bath can be filtered, hot or cold, at a solute content of about 50%. This could involve little or no dilution of the fusion bath. The barium sebacate could then be worked up as per the foregoing description. On acidification of the barium sebacate, some alkali metal chloride may precipitate with the sebacic acid, but the metal chloride can be readily removed by water-washing.

Examples of the process of this invention are presented below:

*Example 1.—Use of barium hydroxide and methyl ricinoleate (tech.)*

The reaction was conducted in an Inconel pot, 6.25 inches in diameter and 10 inches high; the pot was equipped with a tight-fitting glass dome, which was fitted with a separatory funnel for introducing the ricinoleic compound and water, an Inconel stirrer, and a partial condenser to permit refluxing of some of the distillate; a downward condenser was attached at the upper end of the partial condenser; connections were made so that water in the distillate could be returned to the reaction zone. The Inconel pot and contents were heated by means of a heat transfer salt bath, a suitable composition for same being as follows: potassium nitrate 53%, sodium nitrate 7%, and sodium nitrite 40%.

Eighteen moles of sodium hydroxide (720 gms.) and 2 moles of barium hydroxide (512.8 gms.;

$$Ba(OH)_2 \cdot 5H_2O)$$

were charged to the Inconel pot, and the indicated attachments were fitted into place. Heating was started, and, when the temperature of the pot contents reached 235° C., addition of 1 mole (312.5 gms.) of methyl ricinoleate (tech.) via the separatory funnel was started. The addition of the methyl ricinoleate was completed in 1.5 hrs.; 230 ml. of water were also added to the reactor during this period. Heating of the reactor contents at 235°–250° C. was continued for one hour following the completion of the methyl ricinoleate addition. During the course of the reaction, 90 ml. of capryl alcohol were collected in the distillate. On completion of the reaction, further capryl alcohol was recovered by steam distillation of the reaction mass. The total recovery of capryl alcohol amounted to 69.6% of the theoretical yield.

As regards the recovery of sebacic acid from the fusion product, water was added to the latter, after it had cooled, to dissolve the sodium hydroxide. The insoluble barium sebacate was then separated by filtration, a sintered steel funnel being used for this purpose. Barium hydroxide was added to the filtrate, and the resulting precipitate of barium sebacate was separated and combined with the previously separated barium sebacate. The amount of barium sebacate (tech.) recovered was 1070 gms.

*Recovery method A.*—Excess dilute hydrochloric acid was added to 200 gms. of the barium sebacate, and the mixture was boiled for 0.5 hr. The upper oil layer which had formed during the heating was decanted while hot. The aqueous layer was cooled, and the precipitated sebacic acid was separated by filtration and recombined with the oil layer. The resulting mixture was boiled with water, and the upper layer of oil was again decanted hot. The aqueous phase was cooled, and the precipitated sebacic acid was separated by filtration and dried at 105° C. for two hours.

The recovery of pure sebacic acid amounted to 11.75 gms., which would be equivalent to a total yield of 63.2 gms. of pure sebacic acid.

*Recovery method B.*—Excess dilute hydrochloric acid was added to 200 gms. of the barium sebacate, and the mixture was boiled for 0.5 hr. The upper oil layer which had formed during the heating was decanted while hot. The oil layer was washed several times with boiling water, and the aqueous phases were combined with the initial aqueous layer and cooled. The precipitated sebacic acid was separated by filtration, and was then added to boiling water to dissolve any salts present. The solution was then cooled, and the sebacic acid was separated by filtration and dried at 105° C. for two hours.

This method yielded 11.2 gms. of pure sebacic acid, which is equivalent to a total yield of 60 gms. of pure sebacic acid.

An average of the amounts of sebacic acid recovered by the two methods indicated that the yield of sebacic acid (tech.) was 40.0% of theoretical.

*Example 2.—Use of barium hydroxide and methyl ricinoleate (tech.)*

The charge to the Inconel reactor of Example 1 was 36 moles of sodium hydroxide (1440 gms.) and 4 moles of barium hydroxide (1026 gms.; Ba(OH)$_2 \cdot$5H$_2$O). This charge was heated to 250° C., water being evolved during this heating step. When the pot contents reached the reaction temperature, the addition of 2 moles (625 gms.) of methyl ricinoleate (tech.) via the separatory funnel was started. The addition of the methyl ricinoleate was completed in 1.75 hrs.; 210 ml. of water were also added to the reactor during this period, while 500 ml. of water were recovered in the distillate during this period. As soon as the addition of methyl ricinoleate was complete, all heat was cut off from the reactor. The pot contents were allowed to cool with agitation for about one hour. The recovery of capryl alcohol amounted to 156 gms., this representing a yield which was 66.2% of theoretical.

The reaction mass was diluted to approximately a 50% solids content, and the solids were separated by filtration using a sintered steel funnel. The amount of barium sebacate (tech.) recovered was 1698 gms. The solids were worked up per Recovery Method B to yield 188 gms. of pure sebacic acid; this corresponded to a yield of 52% of theoretical.

It will be noted that, in this example, no holding time was used after the completion of the methyl ricinoleate addition. Despite this, the yields were not adversely affected.

*Example 3.—Use of barium hydroxide and methyl ricinoleate (tech.)*

The charge to the Inconel pot was the same as in Example 2. In the present example, the reaction temperature was held at 275° C. The addition of methyl ricinoleate (tech.) (2 moles) was started when this reaction temperature was attained, and was completed in 1.5 hrs. More water (375 ml.) was added than in the preceding examples because of the higher reaction temperature; 725 ml. of water were recovered in the distillate. As soon as the methyl ricinoleate addition was completed, the steam distillation of capryl alcohol from the reaction mixture was started. The total capryl alcohol recovery amounted to 152 gms., corresponding to a yield of 63.2% of theoretical.

The reaction mass was cooled by the very gradual addition of water to the reactor with agitation. Barium sebacate was recovered from the diluted mass by filtration using a sintered steel funnel; the weight of solids recovered was 3015 gms. The sebacic acid (tech.) recovered from the barium sebacate corresponded to a yield of 59.0% of theoretical.

*Example 4.—Use of barium chloride and methyl ricinoleate (tech.)*

The Inconel pot used in the preceding examples was charged with 25 moles of sodium hydroxide (1000 gms.) and 1.6 moles of barium chloride (332 gms.), and the pot contents were heated to 250° C. The addition of 1.6 moles (500 gms.) of methyl ricinoleate (tech.) via the separatory funnel was accomplished over a period of two hours. Water (120 ml.) was added to the pot contents during the course of the reaction, and, during the same period, 280 ml. of water were recovered in the distillate. On the completion of the methyl ricinoleate addition, the pot was allowed to cool, and the contents were then steam distilled to recover the capryl alcohol. The total recovery of capryl alcohol was 105 gms., which represented a yield of 55.3% of theoretical.

The residue from the steam distillation was diluted with water and filtered. The recovered solids were dissolved in hot water, and the precipitate formed on cooling was separated by filtration. The filtrates were combined, and a 1000 gm. portion thereof was neutralized to a pH of 6–7 with sulfuric acid. The barium sulfate formed was separated by filtration. The filtrate was acidified with dilute sulfuric acid, and was allowed to cool prior to recovering the precipitated sebacic acid by filtration. This treatment of the 1000 gm. aliquot (the total filtrate amounted to 7870 gms.) yielded 4.2 gms. of pure sebacic acid.

The barium sebacate (tech.) recovered by filtration amounted to 880 gms. A 50 gm. portion of this material was boiled in dilute hydrochloric acid for 0.5 hour. The precipitated sebacic acid was recovered from the cooled solution by filtration, and was dried in an oven. The pure sebacic acid recovered in this step from the 50 gm. portion of solids amounted to 3.4 gms. The overall yield of pure sebacic acid, from the filtrate and from the solids, amounted to 32.0% of theoretical.

*Example 5.—Use of barium hydroxide and ricinoleic acid (tech.)*

The charge to the Inconel pot used in the previous examples was 36 moles of sodium hydroxide (1440 gms.) and 4 moles of barium hydroxide (1026 gms.; $Ba(OH)_2 \cdot 5H_2O$)

The pot contents were heated to the reaction temperature of 250° C. Two moles (596 gms.) of ricinoleic acid (tech.) were added to the pot via the separatory funnel over a period of 2.5 hours. At the end of this time, the heat was turned off and the reaction vessel was allowed to cool. During the reaction period, 350 ml. of water were added to the reaction pot, and 570 ml. of water were recovered in the distillate. The total recovery of capryl alcohol in the distillate and by steam distillation was 156 gms., which corresponded to a yield of 65% of theoretical.

After cooling, the reaction mass was diluted with water and then filtered, using a sintered steel funnel. The barium sebacate (tech.) solids weighed 1830 gms. Sebacic acid was recovered therefrom by the hydrochloric acid treatment procedure used in the preceding examples. The recovery of sebacic acid amounted to 190 gms., which corresponded to a yield of 52.5% of theoretical.

*Example 6.—Use of barium hydroxide and castor oil*

The Inconel pot was charged and heated as in Example 5. Castor oil (0.67 mole; 620 gms.) was charged to the pot via the separatory funnel over a period of 2.85 hours. Heating of the reaction vessel was then discontinued. The amount of water added to the reactor during the reaction was 360 ml., and the water recovered in the distillate was 650 ml. The total recovery of capryl alcohol was 150 gms., amounting to a yield of 63.8% of theoretical.

Barium sebacate (tech.) was recovered in the usual manner in the amount of 2470 gms. This material was worked up as in the preceding examples by boiling with dilute hydrochloric acid. The recovery of sebacic acid amounted to 222.5 gms., which corresponded to a yield of 61.0% of theoretical.

*Example 7.—Use of barium ricinoleate (tech.)*

The Inconel reactor was charged with 25 moles (1000 gms.) of sodium hydroxide and 200 gms. of water, and this charge was heated to 250° C. Barium ricinoleate (0.55 mole; 400 gms.) was then added to the fusion bath gradually over a period of 1.5 hours. During this time, 50 ml. of water were added to the reaction zone, and 104 ml. of water were recovered in the distillate. The next step was the addition of water to the reactor for the purpose of steam distilling residual amounts of capryl alcohol therefrom. The total recovery of capryl alcohol was 80 gms., which represented a yied of 62.5% of theoretical.

The cooled reaction mass was dissolved in water, and the resulting solution was boiled for 0.5 hour. The solution was allowed to stand over night, and was then filtered. A 1000 gm. aliquoit of the filtrate (total: 7100 gms.) was neutralized to a pH of 6–7 with hydrochloric acid, and the resulting upper layer of fats was removed by decantation. Hydrochloric acid was added to the aqueous layer to bring the pH to 2–3. The resulting mixture was allowed to stand in a refrigerator over a week-end, and the sebacic acid was then recovered by filtration. The recovery of pure sebacic acid from the 1000 gm. aliquot was 12.1 gms., which corresponded to a yield of 43.2% of theoretical.

*Example 8.—Use of barium hydroxide, potassium hydroxide, and ricinoleyl alcohol (tech.)*

The charge to the Inconel pot was 36 moles of potassium hydroxide (2020 gms.) and 3.5 moles of barium hydroxide (897 gms.; $Ba(OH)_2 \cdot 5H_2O$). After the pot attachments had been fitted into place, the pot contents were heated to the reaction temperature of 250° C. The addition of 1 mole (284.5 gms.) of ricinoleyl alcohol (tech.) via the separatory funnel was completed in 1.5 hours; 235 ml. of water were also added to the reactor during this period. Heating of the reactor was discontinued on the completion of the ricinoleyl alcohol addition. The total recovery of capryl alcohol, in the distillate during the reaction and by steam distillation thereafter, amounted to 69.3% of the theoretical yield.

The sebacic acid was recovered by a method corresponding to that used in the preceding examples, namely, dilution of the fusion product, filtration, and boiling of the recovered solids with dilute hydrochloric acid; the yield of pure sebacic acid amounted to 51.7% of theoretical.

*Example 9.—Use of barium hydroxide, lithium hydroxide, and methyl ricinoleate (tech.)*

The Inconel pot was charged with 36 moles of lithium hydroxide (864.5 gms.) and 5 moles of barium hydroxide (1282 gms.; $Ba(OH)_2 \cdot 5H_2O$). The pot attachments were fitted into place, and the pot contents were heated to the reaction temperature of 250° C. The methyl ricinoleate (tech.), in an amount of 1 mole (312.5 gms.), was then added to the reaction zone via a separatory funnel over a period of 1.25 hours. Additional water, in the amount of 225 ml., was added to the reactor during this period. At the conclusion of the addition of the ricinoleic compound, heating of the reaction pot was discontinued, and the products were worked up in the usual manner. The yield of capryl alcohol was 70.1% of theoretical, while that of pure sebacic acid was 51.4% of theoretical.

*Example 10.—Use of barium hydroxide and sodium ricinoleate (tech.)*

The Inconel pot was charged with 10 moles of sodium hydroxide (400 gms.) and 2 moles of barium hydroxide (512.8 gms.; $Ba(OH)_2 \cdot 5H_2O$). After the pot contents had been heated to the reaction temperature of 250° C., 1 mole (320.5 gms.) of sodium ricinoleate (tech.) was added to the reactor through a powder funnel over a period of 1.25 hours; 240 ml. of water were also added to the reaction zone during this period. On completion of the addition of the ricinoleic compound, the heating was discontinued, and the product was worked up in the usual manner. The yield of capryl alcohol amounted to 68.7% of theoretical, while that of pure sebacic acid was 50.9% of theoretical.

*Example 11.—Use of barium hydroxide and methyl ricinoleate (tech.)*

This example was performed in a manner similar to that of Example 9, except that the initial charge to the pot was 20 moles of sodium hydroxide (800 gms.) and 5 moles of barium hydroxide (1282 gms.; $Ba(OH)_2 \cdot 5H_2O$). And the yields were: capryl alcohol, 71.6% of theoretical; pure sebacic acid, 52.3% of theoretical.

*Example 12.—Repeat of Example 1 at 325° C.*

Example 1 was duplicated, except that the reaction temperature was 325° C., and more water (750 ml.) was added to the reactor during the period of methyl ricinoleate addition. The time for the methyl ricinoleate addition was cut to 1 hour, and the heating was stopped at the end of this time period. The reaction products were recovered in the usual manner in good yield: capryl alcohol, 70.1% of theoretical; pure sebacic acid, 51.8% of theoretical.

*Example 13.—Recycle run*

The Inconel reactor was charged with 36 moles of sodium hydroxide (1440 gms.) and 4 moles of barium hydroxide (1026 gms.; $Ba(OH)_2 \cdot 5H_2O$). The charge was heated to 250° C., and during this step 190 ml. of water were distilled off and condensed. The addition of 2 moles (625 gms.) of methyl ricinoleate (tech.) was then begun via a separatory funnel having a stopcock, which was used to control the rate of addition. The addition of the methyl ricinoleate was complete in 100 minutes, during which time 300 ml. of water were also added to the reaction mass. All heat was cut off from the reactor, and water was added at a slow rate to steam distill the residual capryl alcohol from the reaction mass. The total recovery of capryl alcohol amounted to 156 gms., this representing a yield which was 66.2% of theoretical.

Sufficient water was added to dilute the reaction mass to a concentration of about 50%. The insoluble barium sebacate was then separated by filtration, a sintered steel Buchner funnel being used. The fusion product filtrate was set aside for recycling. The weight of recovered barium sebacate cake (tech.) was 1820 gms. (wet).

Excess dilute hydrochloric acid (1500 ml. conc. HCl plus 4000 ml. $H_2O$) was added to the barium sebacate (tech.) and the mixture was boiled for 0.5 hr., at which time the solids had completely dissolved. The upper oil layer which had formed was decanted hot, and the aqueous layer was set aside for recovery of sebacic acid and barium chloride. The oil layer was washed several times with boiling water, and the aqueous phases were decanted and cooled. The precipitated sebacic acid, separated by filtration from each of the aqueous phases, was combined and dried at 105° C. for two hours. This method yielded 215 grams of sebacic acid (tech.), corresponding to a theoretical yield of 60.0%.

The aqueous filtrates from the sebacic acid filtrations were concentrated to a 50% solids content. This solution containing barium chloride was added to the fusion product filtrate which had previously been set aside for recycling. The mixture was then heated at 110° C. with agitation over a 0.5 hr. period to convert the barium chloride to barium hydroxide in the presence of excess NaOH. The mass was filtered hot, using a sintered steel Buchner funnel. The solids so recovered amounted to 317 grams, and consisted of sodium chloride and a small amount of barium hydroxide.

The filtrate was placed in the Inconel reactor, along with 100 gms. of barium hydroxide ($Ba(OH)_2 \cdot 5H_2O$), and the whole was heated in a salt bath to the desired reaction temperature, 250° C. The addition of 2 moles (625 gms.) of methyl ricinoleate (tech.) was then begun. The addition was made in a rapid dropwise manner over a period of two hours. The indicated processing procedure was followed to recover capryl alcohol and barium sebacate. The capryl alcohol recovered amounted to 154 gms. or 64% of theoretical.

The barium sebacate solids were processed, as detailed above, to recover 171 gms. of sebacic acid (47.5% of theoretical). The filtrates from the sebacic acid recovery were used as recycle material in the processing of further quantities of methyl ricinoleate (tech.).

The reactions in the preceding examples went smoothly and with no foaming. But, when the barium compound was omitted from any of these examples, the resulting foaming was violent and the process was entirely impracticable. The process of this invention can also be conducted in a continuous manner, with constant charging of reactants to the fusion bath and constant removal of reaction products therefrom, the recycling of alkali metal hydroxide and barium compounds being suitably effected as per Example 13. In all cases, the yields of sebacic acid and capryl alcohol are superior to those obtainable by prior art methods. The instant reaction proceeds simply without the need of such prior art requirements as super-atmospheric pressures and the presence of inert organic liquids, and the process has the added advantage of eliminating the need for neutralization of the alkaline fusion bath. The particular apparatus used in the foregoing examples is not essential to the process of this invention, as this process can be conducted in any equivalent apparatus which is not subject to attack by hot alkalis and which is suitably equipped for agitation of the reaction mass, introduction of the reactants, and recovery of the reaction products.

Numerous modifications and variations in the invention described herein will be apparent to those skilled in the art, and are within the spirit and scope of the appended claims.

What is claimed is:

1. A process for the conversion of ricinoleic compounds into other organic compounds including a salt of sebacic acid, which comprises charging a ricinoleic compound and water to an enclosure containing a heated, fluid alkali metal hydroxide bath, said bath having, as a constituent, a barium compound in an amount of from about 0.5 to about 5.0 moles per mole of effective ricinoleic compound.

2. The process of claim 1, in which said ricinoleic compound is a ricinoleic acid ester.

3. The process of claim 1, in which said ricinoleic compound is methyl ricinoleate.

4. The process of claim 1, in which said ricinoleic compound is ricinoleyl alcohol.

5. The process of claim 1, in which said ricinoleic compound is an alkali metal salt of ricinoleic acid.

6. The process of claim 1, in which said ricinoleic compound is sodium ricinoleate.

7. The process of claim 1, in which said ricinoleic compound is barium ricinoleate.

8. The process of claim 1, in which said alkali metal hydroxide is sodium hydroxide.

9. The process of claim 1, in which said barium compound is barium hydroxide.

10. The process of claim 1, in which the amount of said water charged to said enclosure is sufficient to maintain from about 4 to about 5 moles of water per mole of effective ricinoleic compound in the reaction zone.

11. The process of claim 1, in which said bath, prior to being heated, contains up to about 20% of water by weight.

12. The process of claim 1, in which said bath contains at least about 5 moles of alkali metal hydroxide per mole of effective ricinoleic compound.

13. The process of claim 1, in which said bath contains from about 2.0 to about 5.0 moles of barium hydroxide and from about 10 to about 20 moles of sodium hydroxide per mole of effective ricinoleic compound.

14. The process of claim 1, in which said bath is heated to from about 225° to about 375° C.

15. The process of claim 1, in which said bath is heated to from about 225° to about 300° C.

16. The process of claim 1, in which the reaction is effected under partial reflux conditions.

17. The process of claim 1, in which, subsequent to the completion of the reaction, the barium sebacate formed in the reaction is separated, and sebacic acid is recovered by acidification of the barium sebacate.

18. The process of claim 1, in which, subsequent to the completion of the reaction, said bath is cooled, and diluted with water, the barium sebacate formed in the reaction is separated by filtration, and sebacic acid is recovered by acidification of the barium sebacate with a mineral acid.

19. The process of claim 1, in which, subsequent to the completion of the reaction, said bath is cooled, and diluted with water, the barium sebacate formed in the reaction is separated by filtration, sebacic acid is recovered by acidification of the barium sebacate with hydrochloric acid, and is separated by filtration, the resulting filtrate containing barium chloride is combined with the filtrate containing barium hydroxide and alkali metal hydroxide from the barium sebacate filtration, the resulting combined solution is concentrated to at least a 50% concentration, the resulting alkali metal chloride precipitate is separated by filtration, and the resulting filtrate containing barium hydroxide and alkali metal hydroxide is returned to the reaction enclosure for reaction with further quantities of said ricinoleic compound.

References Cited in the file of this patent

UNITED STATES PATENTS

| | | |
|---|---|---|
| 2,304,602 | Schrauth et al. | Dec. 8, 1942 |
| 2,625,558 | Logan | Jan. 13, 1953 |
| 2,693,480 | Haury | Nov. 2, 1954 |